J. POWERS.
COMBINATION SALES SLIP AND STATISTICAL CARD RECORD RECORDER.
APPLICATION FILED DEC. 30, 1915.
1,248,543.
Patented Dec. 4, 1917.
7 SHEETS—SHEET 7.
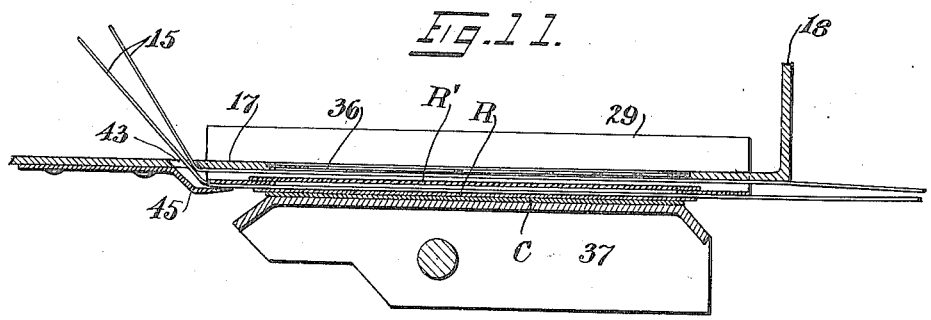

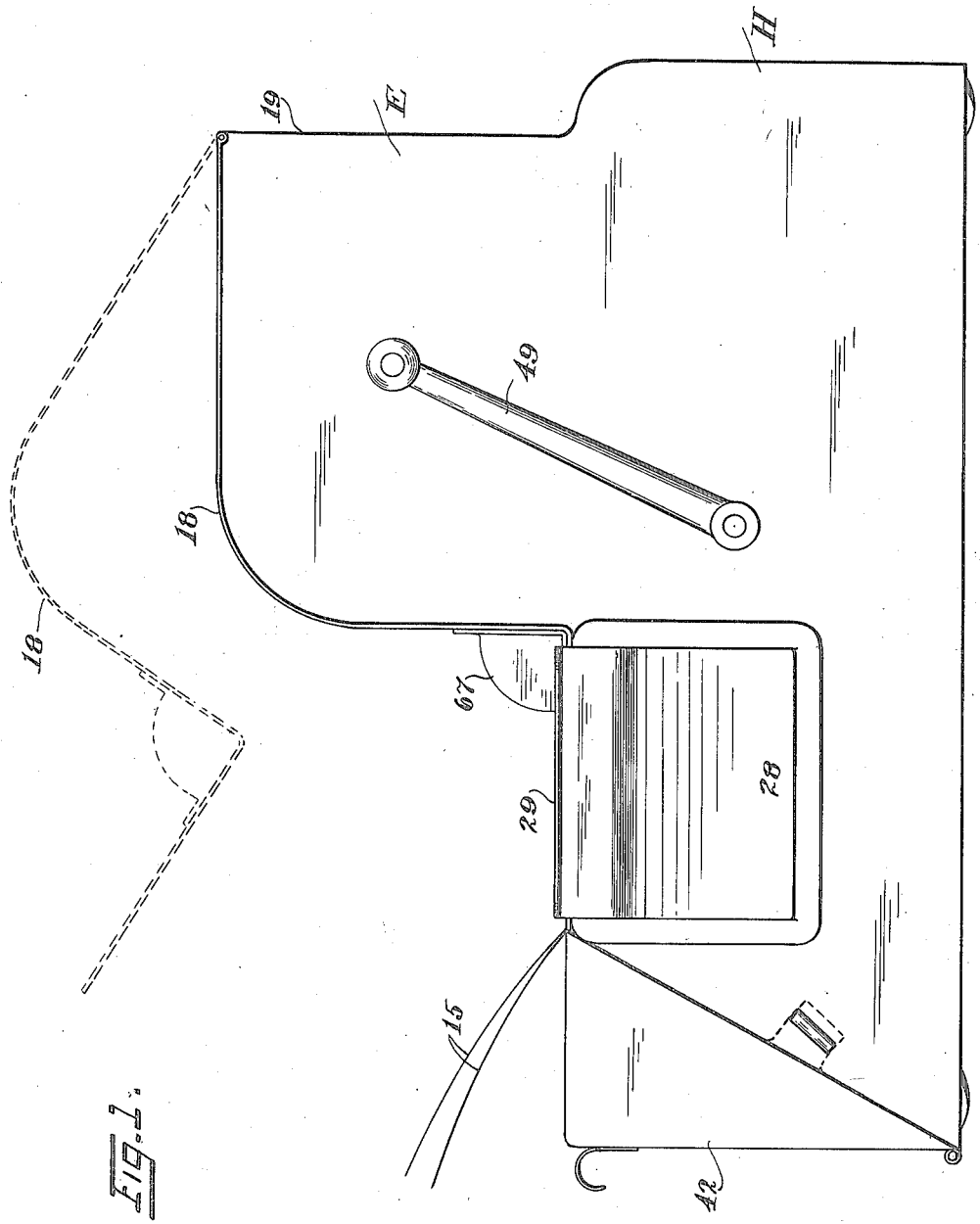

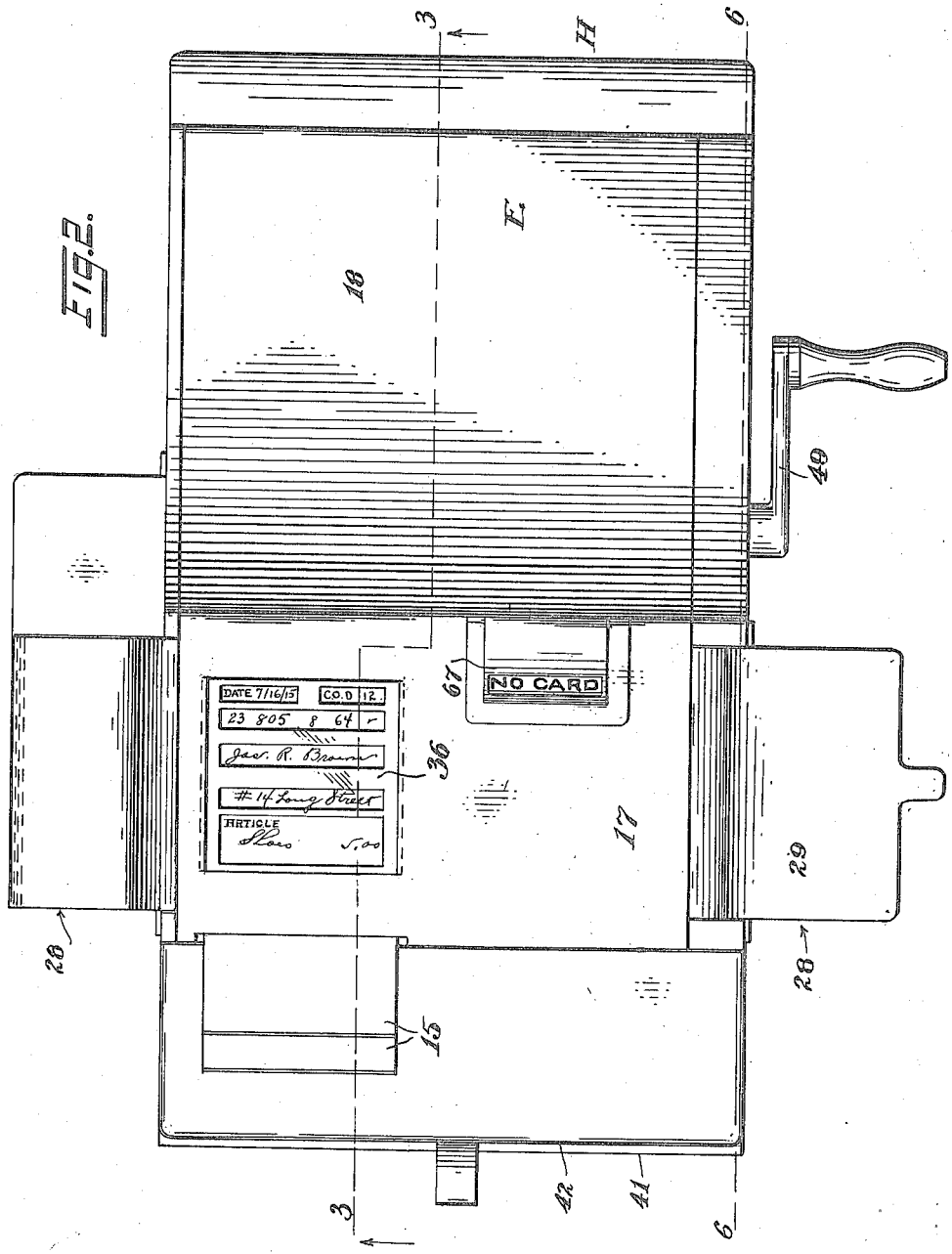

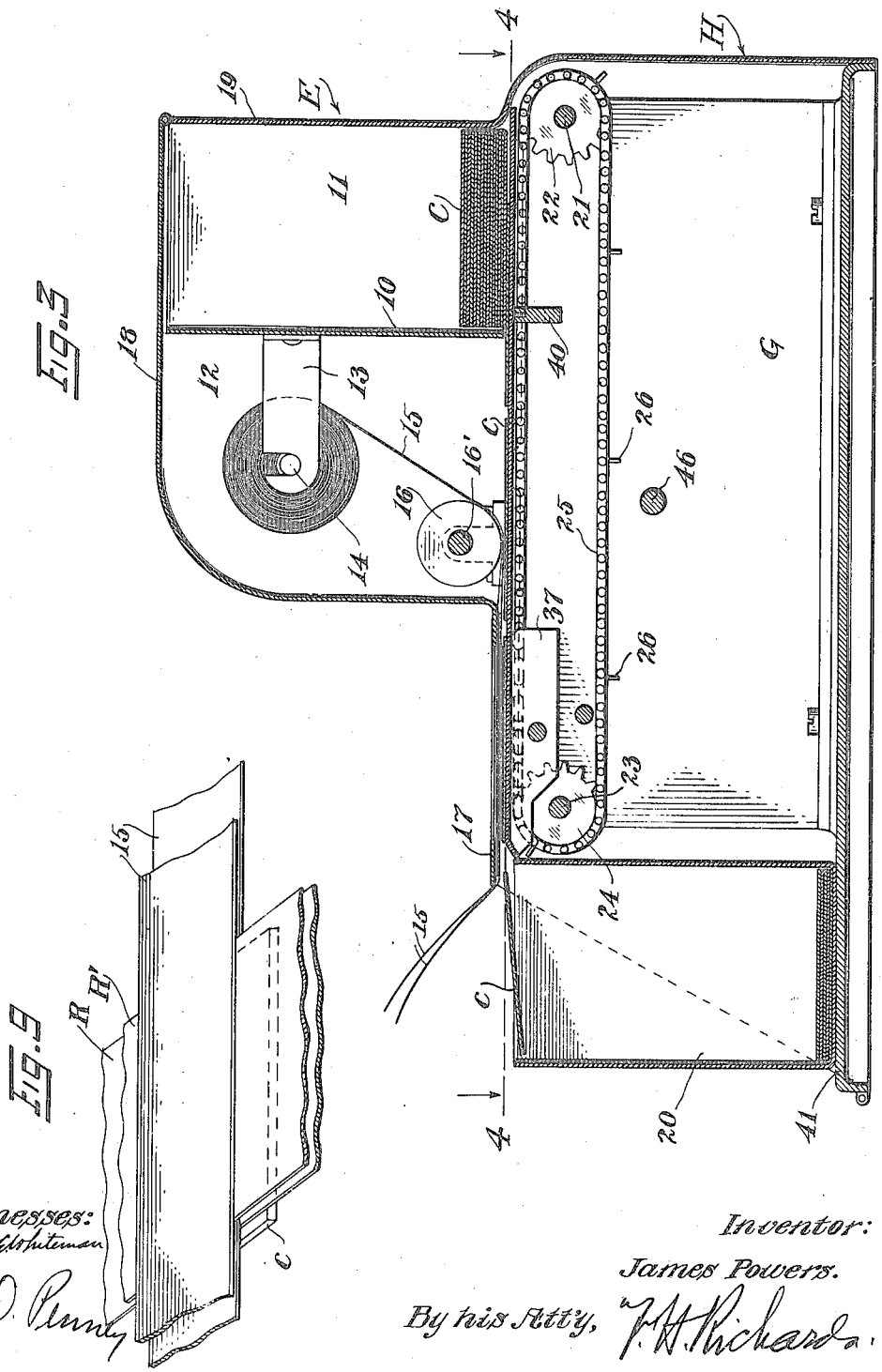

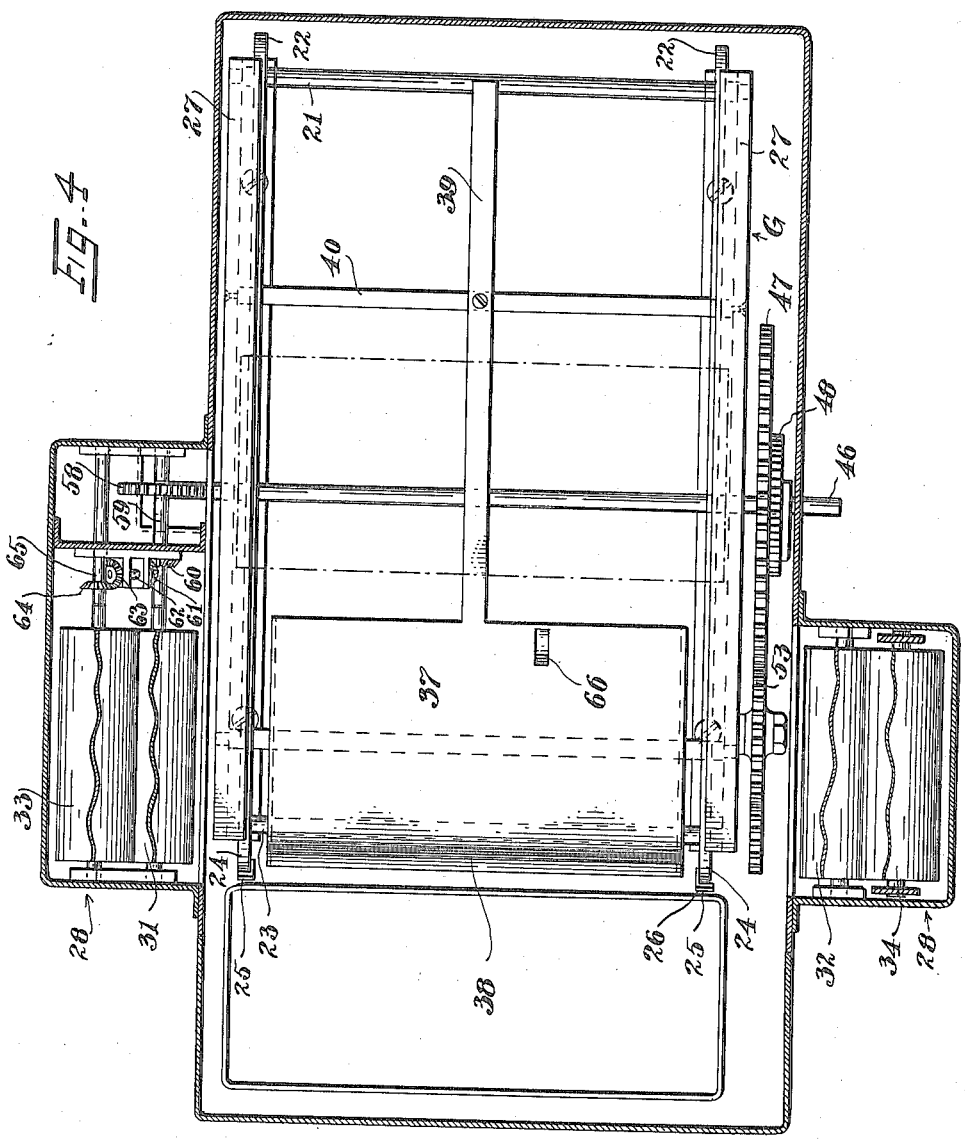

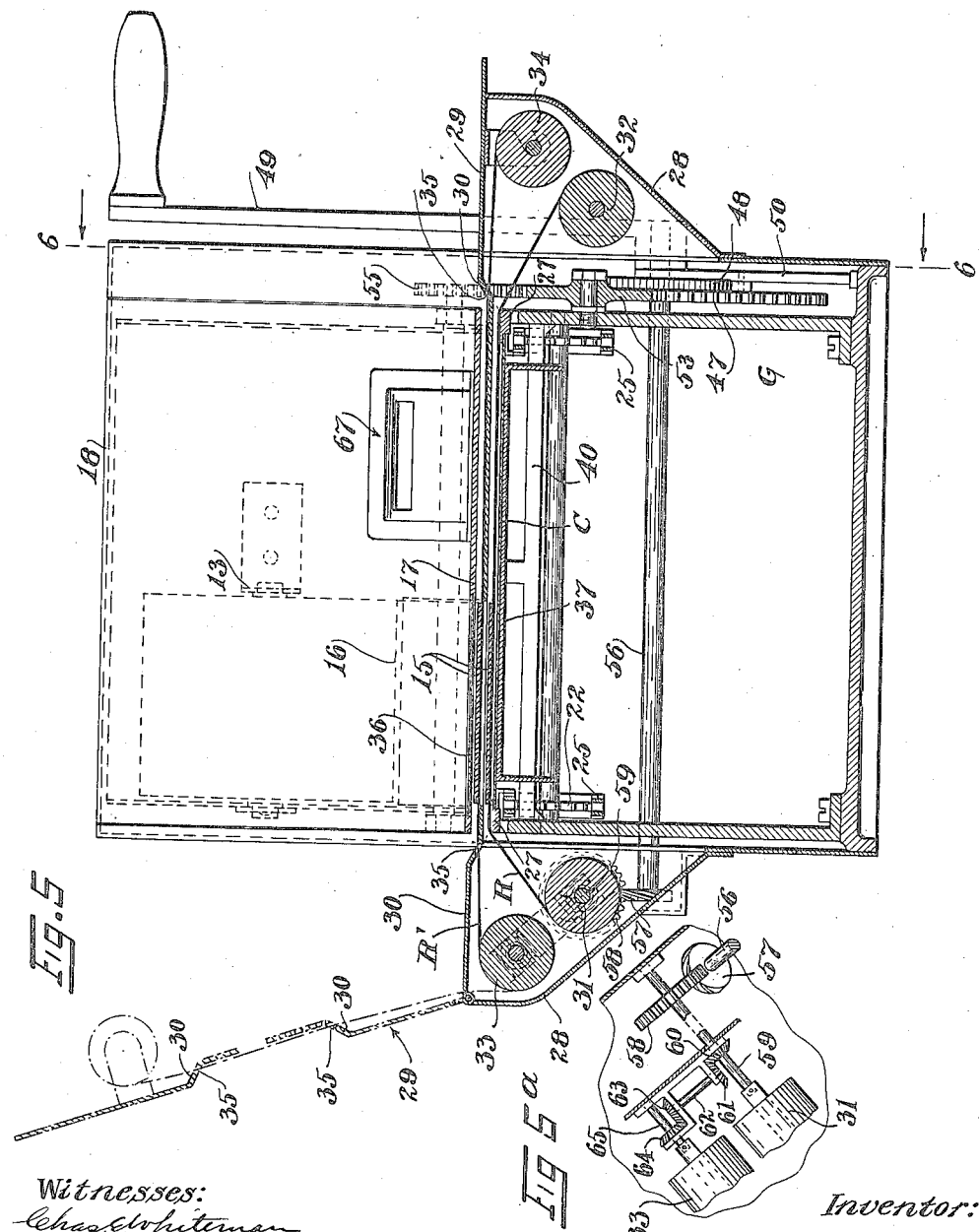

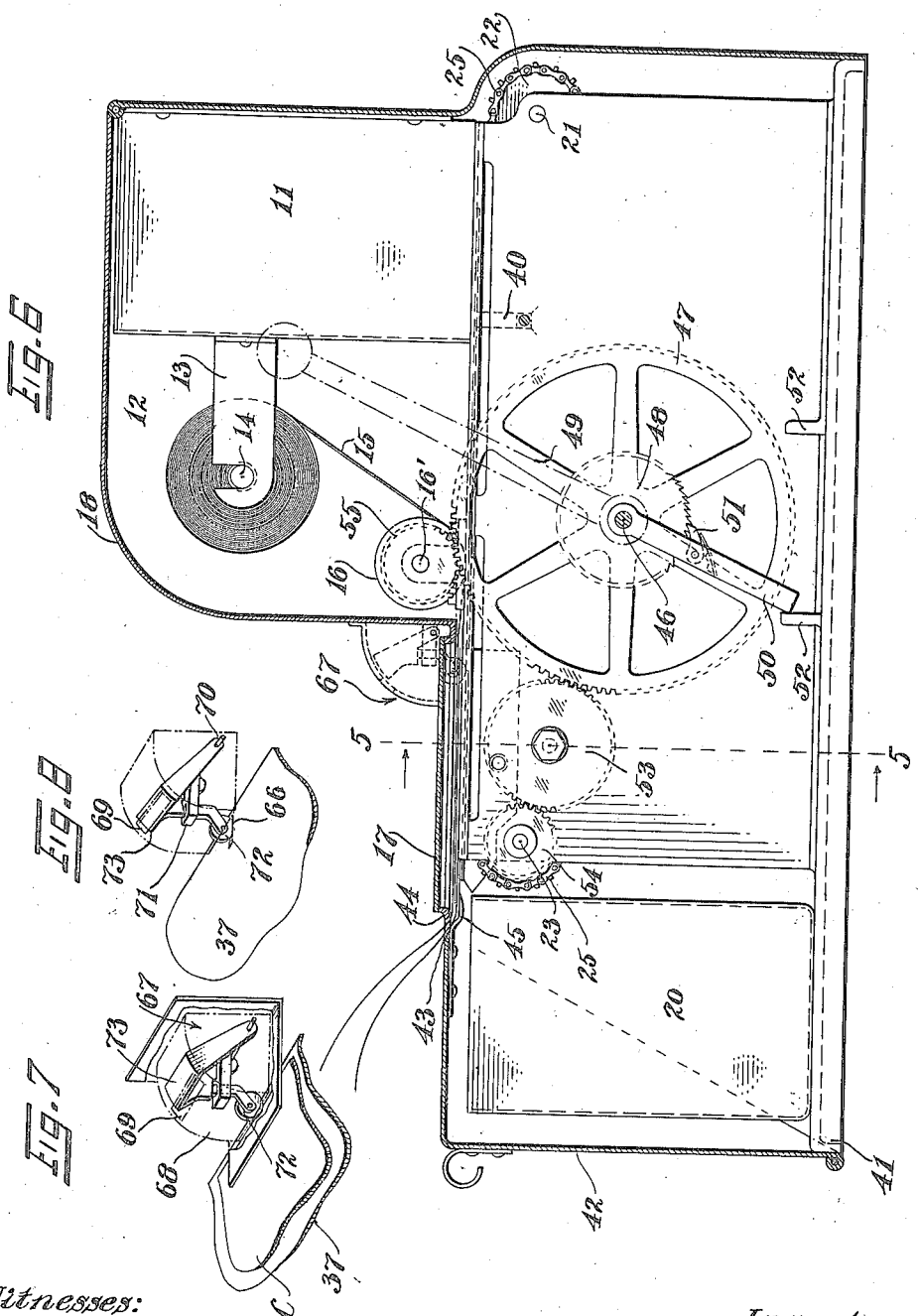

UNITED STATES PATENT OFFICE.

JAMES POWERS, OF NEW YORK, N. Y., ASSIGNOR TO POWERS ACCOUNTING MACHINE COMPANY, OF NEW YORK, N. Y., A CORPORATION OF DELAWARE.

COMBINATION SALES-SLIP AND STATISTICAL-CARD-RECORD RECORDER.

1,248,543.               Specification of Letters Patent.        Patented Dec. 4, 1917.

Application filed December 30, 1915. Serial No. 69,460.

*To all whom it may concern:*

Be it known that I, JAMES POWERS, a citizen of the United States, residing in New York, in the county of New York and State of New York, have invented certain new and useful Improvements in Combination Sales-Slips and Statistical-Card-Record Recorders, of which the following is a specification.

This invention relates to combined card accounting and autograph recording machines.

Among the objects of the invention it is aimed to provide a machine whereby a plurality of copies of records may be produced, similar to the duplicate sales system now in use in the department stores whereby a slip is made out for the buyer, another slip for the cashier, and a card for the auditor. The auditor's card is provided with a portion to which a perforated record of the written portion of the card may later be transferred.

Another object of the present invention is to provide with an arrangement as aforesaid a receptacle for receiving the auditor's cards which are kept separate from the other slips.

Another object of the invention is to provide a receptacle into which the auditor's card is discharged, which receptacle is properly inclosed to prevent tampering with the auditor's cards before despatching to the auditor.

A particular feature of the invention is the provision of means for signaling to the operator when the supply of cards has been exhausted.

These and other features, capabilities and advantages of the invention will appear from the subjoined detailed description of one specific embodiment thereof illustrated in the accompanying drawings in which—

Figure 1 is a side elevation of the machine.

Fig. 2 is a plan view of the same.

Fig. 3 is a longitudinal section along the line 3—3 of Fig. 2.

Fig. 4 is a section along the line 4—4 of Fig. 3.

Fig. 5 is a front elevational view partly in section showing the arrangement of the inking ribbons.

Fig. 5ª is a fragmental view showing the driving connection of the inking ribbons.

Fig. 6 is a longitudinal section along the line 6—6 of Fig. 5.

Fig. 7 is a fragmental perspective showing the card signaling means when writing on a card, and Fig. 8 is a similar fragmental perspective showing the position of the card signaling means when no card is present.

Fig. 9 is a fragmental perspective showing the relative positions of the inking ribbons and the slip sheets and card to be printed.

Fig. 10 is a plan of the auditor's card.

Fig. 11 is a fragmental detail illustrating in side elevation the relative positions of the several inking ribbons and slip sheets and card to be printed.

In the embodiment shown a housing H is provided having in the rear portion thereof a rear extension E which is provided with a partition 10 to divide the same into a card reservoir 11 disposed in the rear of the partition 10 to accommodate the cards C and a paper roll compartment 12. In the front of such partition 10, supports 13 are secured to the front of the partition 10 on which a pin 14 is mounted, two parallel strips of paper 15 in the present instance being simultaneously wound on said pin 14. At the lower end of the compartment 12, a feeding roller 16 is mounted on the shaft 16' for guiding the strips of paper forward under the forward extension 17 of the cover 18 which is pivotally connected to the rear wall 19 of the upper extension E, the extension 17 of the cover 18 serving as the support for the hands of the operator when making out the records. To receive the auditor's cards discharged from the machine, a receptacle 20 is formed in the front portion of the housing H.

Near the rear upper end of the housing H a shaft 21 is provided on which are fixed the sprocket wheels 22 and adjacent to the receptacle 20 near the front upper end of the housing H, the shaft 23 is mounted on which are fixed the sprocket wheels 24. The sprocket wheels 22 and 24 support and convey the sprocket chains 25 which have secured to them card pickers 26 in alinement with one another and spaced apart on said sprocket chains a distance to conveniently accommodate one of the cards C between adjacent pairs of pickers 26 along the chains 25. As clearly shown in Figs. 4 and 5, the chains 25 travel under the side rails 27 guiding the cards C in such position. To the sides of the front portion of the housing H there are formed side extensions 28. To the upper end of one of the extensions 28 there is pivotally connected a plate 29 and adapted when swung in closed position to have its free end rest on the other extension 28. The middle portion of this plate 29 is bent downward by means of the bends 30 and a large part of the portion between the bends 30 cut away. In the lower portions of the extensions 28 there are provided shafts 31 and 32 on which the ribbon R is wound which ribbon when passing from one shaft to the other passes over the rails 27. Above the shafts 31 and 32, the shafts 33 and 34 respectively are mounted, the shafts 31, 32 and 33 being secured to the extensions 28 while the shaft 34 is secured to the plate 29. The ribbon R' is wound on the shafts 33 and 34 and while passing from one shaft to the other extends through the openings 35 formed in the bends 30 of the plate 29.

In the extension 17 an opening is formed to one side thereof, in which opening is positioned a sheet of celluloid 36 slotted so that portions of the paper passed under the extension 17 will be exposed to permit writing thereon.

To form a guide for the middle of the cards C while being conveyed by the pins 26, the plate 37 is provided and extends rearwardly under the extension E. The front end 38 of the plate 37 is rounded to permit the discharge of the cards C downward therefrom and extending rearward therefrom there is provided a long narrow strip 39 which is supported on the cross-piece 40 secured to the housing G. The strip 39 serves as a supporting guide for the middle of the cards while being conveyed to the plate 37.

Serving as a cover for the receptacle 20, there is pivotally secured to the floor member 41 a cover member 42 which, in closed position, forms a closure for the front of the housing H. The rear upper end of the member 42 is provided with an opening 43 serving as a discharge port through which the two sheets of paper 15 are discharged and beyond such opening 43 the rear upper end terminates in a seat 44 for the extension 17. Below the opening 43, there is provided a deflecting member 45 the rear edge of which is disposed in the path of movement of the cards C being conveyed by the chains 25 and serving to deflect the cards C into the receptacle 20.

For driving the sprocket wheels 22 and 24, a main shaft 46 is provided on which the lever 49 is fixed, and the main driving gear 47 and the ratchet wheel 48 are loosely mounted. The driving gear 47 and ratchet wheel 48 are fixed to rotate with one another. The lever 49 is disposed on the portion of the shaft projecting outside of the housing H while the driving gear 47 and ratchet wheel 48 are disposed inside on the housing H. Also fixed on the shaft 46 there is disposed a lever 50 adjacent to the ratchet wheel 48 and having a spring pressed pawl 51 thereon adapted to engage the ratchet wheel 48. The ratchet wheel 48 and gear 47 are fixed to rotate with one another. The movement of the lever 50 and therewith the lever 49 is limited by the stops 52. The arrangement is such that the swinging of the lever 49 forward will swing the lever 50 rearward and this lever 50 by its connection with the ratchet wheel 48 will actuate the gear 47 through a certain distance of movement. Upon returning the lever 49 to its rearward position, the lever 50 will swing forward and the pawl 51 be permitted to slide over the teeth of the ratchet wheel 48 without moving the same.

The gear 47 is in mesh with the intermediate gear 53 which is in mesh with the gear 54 on the shaft 23 whereby the sprocket wheels 24 and 22 will be actuated. The timing of the gears with the movement of the lever 49 is such that with every actuation of the lever 49 the sprocket chains 25 will be advanced a distance sufficient to discharge a card into the receptacle 20 and to position a new one under the extension 17. Simultaneously with the actuation of the chains 25 the paper feed roller 16 is actuated, the gear 47 being in mesh wtih the gear 55 mounted on the shaft 16' to which the roller 16 is fixed, the gear 55 and roller 16 relative to the gear 47 being timed so that the length of paper strips advanced is equal to the length of the distance a card C is advanced with every actuation of the lever 49.

Simultaneously with the feeding of the paper strips 15 and the cards C, the ribbons R and R' are advanced, the gear 53 being fixed on the shaft 56 to one end of which the worm 57 is fixed which is in mesh with the worm wheel 58 mounted on the shaft 59 on which the roller 31 is mounted. On the shaft 59 is fixed a bevel gear 60 in mesh with the bevel gear 61 on the shaft 62 on which the bevel gear 63 is also mounted which is in mesh with the bevel gear 64 on the shaft 65 on which the roller 33 is mounted so that both rollers 31 and 33 are rotated in the same direction.

The strips of paper 15 as shown in Fig. 5 are considerably narrower than the cards C the purpose of this being to use only one side of the cards C for the duplication of the written matter which is written on the strips and the other portion of the cards C see Fig. 10 for the perforation of the record to be later transferred from the written matter.

For indicating to the operator that no card is disposed on the plate 37 there is provided in the plate 37 a recess 66 which is disposed adjacent to the cover 18 so that it will be disposed directly under the rear edge of a card C when positioned on the plate 37 and on the side of the plate 37 where only the card C traverses.

To the cover 18 there is secured a small housing 67 having a rounded front face 68 in which there is formed a slot 69. The shaft 70 extends through the sides of the housing 67 to which is fixed a bracket 71 on which the caster 72 is mounted. The bracket 71 is also provided with a plate 73 on which are written the words "No card". The caster 72 is disposed to ride into the recess 66 when no card is disposed beneath the same and when in such position, the bracket will be so swung down that the plate 73 will appear at the opening 69 and display the words "No card" indicating to the operator that no card is positioned on the plate 37.

In the operation of the device the cards C will be fed over the plate 37; over the rails 27 the ribbon R will pass and thus be disposed over the card C positioned on the plate 37, then the lowest strip of paper will be passed over the ribbon R, then the plate 29 will be swung down so that its free end engages the other extension 28 and the ribbon R' disposed across the lower strip of paper, then the upper strip of paper passes over the ribbon plate 29 and the ribbon R' and then the cover 18 is swung down, so that the extension 17 is disposed across the upper sheet of paper. In such position, the celluloid sheet 36 will be disposed across the upper sheet of paper, its openings exposing portions of the upper strip. The printed matter of the card C will be in alinement with the openings of the sheet 36. Then upon the record of a sale being written in the openings of the sheet 36 on the upper sheet of paper, the same record will be simultaneously transferred to the lower sheet of paper and to the card C disposed on the plate 37. Thereupon lever 49 may be swung forward and the lengths of the paper containing the record will be fed out. These strips may then be torn off or cut off, and simultaneously therewith the card C disposed underneath such strips of paper will be discharged into the receptacle 20. Simultaneously with this latter movement fresh lengths of paper will have been fed under the sheet 36 and a new card positioned on the plate 37. If, in the operation, the supply of cards shall have been exhausted, or a picker fail to advance a card so that the plate 37 has no card disposed thereon this fact will immediately be signaled to the operator by the indicator plate 73 being dropped to display its signal at the opening 29.

It is obvious that various changes and modifications may be made to the details of construction without departing from the general spirit of the invention.

I claim:

1. In a device of the character described having paper feeding means, a card conveyer for conveying a card adjacent to the strips of paper being fed, inking means disposed between the strips of paper and the card, means for discharging the card and for simultaneously actuating the card conveyer and the paper feeding means, and a deflector for deflecting the cards in a different direction from the discharge of the strips of paper.

2. In a device of the character described, inking means, means for feeding strips of paper to said inking means, means for advancing cards to said inking means, the paper feeding means and card conveying means also serving to discharge the card to feed out portions of the strip of paper, means for simultaneously actuating the card conveyer and paper feeding means, and a deflector for deflecting the card in another direction when being discharged than the path of movement of said strips of paper.

3. In a device of the character described, inking means, means for feeding strips of paper to said inking means, means for advancing cards to said inking means, the paper feeding means and card conveying means also serving to discharge the card to feed out portions of the strip of paper, means for simultaneously actuating the card conveyer and paper feeding means, a plate disposed across the inking means, there being openings therein at one side thereof above the path of movement of the strips of paper so that the strips of paper will be exposed at such openings for matter to be written thereon, this matter being transferred to the portion of card disposed beneath such strips of paper, while the other portion of the card will have no written matter thereon.

4. In a device of the character described, inking means, means for feeding cards and strips of paper to said inking means, and means for indicating when no card is fed to the inking means.

5. In a device of the character described, inking means, means for feeding cards and strips of paper to said inking means, a plate disposed under the inking means on which the card will rest after having been fed thereto, a portion of the card having no part of the strips of paper disposed above it when positioned on such plate, and means for indicating when no card is fed to the plate.

6. In a device of the character described, inking means, means for feeding cards and strips of paper to said inking means, a plate disposed under the inking means on which the card will rest after having been fed thereto, a portion of the card having no part of the strips of paper disposed above it when positioned on such plate, and means for indicating when no card is fed to the plate, said means comprising a bracket pivotally mounted above the portion of the plate across which the strips of paper do not pass, an indicating sign on said bracket, a caster on said bracket, there being a recess in said plate adjacent to said caster, said caster riding in said recess when no card is positioned on the plate and thereby displaying its sign.

7. In a device of the character described, inking means, means for simultaneously feeding cards and strips of paper to said inking means, an inclosed receptacle disposed adjacent to said inking means, the feeding means also serving to discharge said card and strips of paper upon its further actuation after having fed such card and strips of paper to said inking means, there being an opening to said inclosed receptacle, a deflector at said opening to receive and deflect the cards discharged into said inclosed receptacle and guide the strips of paper in another direction.

8. In a device of the character described, inking means, means for simultaneously feeding lengths of said strips of paper and cards to said inking means, said feeding means serving to discharge said lengths of paper and card from said feeding means upon further actuation after having fed said lengths of paper and card to said inking means, an inclosed receptacle disposed adjacent to said inking means, there being a mouth to said receptacle, a deflector at such mouth for deflecting the discharged card into said inclosed receptacle and guiding the lengths of strips of paper into another direction.

9. In a device of the character described, a plurality of inking ribbons, means for feeding a card and strips of paper to said inking ribbons, and means for simultaneously actuating said feeding means and said inking ribbons.

10. In a device of the character described, a frame, guides on said frame, a plate on said frame, an inking ribbon disposed to extend across said guides and above said plate, a second plate pivotally connected to one side of said frame, a second inking ribbon mounted on said second plate, a cover plate pivotally connected to aforesaid side of said frame, and means for feeding a card and strips of paper to said inking ribbons, the card after having been fed to such inking ribbons being disposed on said first plate underneath said first ribbon, one of said strips of paper being disposed above said first ribbon, the second pivotally mounted plate being disposed over said first strip of paper, the second strip of paper extending across said second plate, and the cover plate extending across the second strip of paper.

11. In a device of the character described, a frame, guides on said frame, a plate on said frame, an inking ribbon disposed to extend across said guides and above said plate, a second plate pivotally connected to one side of said frame, a second inking ribbon mounted on said second plate, a cover plate pivotally connected to the aforesaid side of said frame, and means for feeding a card and strips of paper to said inking ribbons, the card after having been fed to such inking ribbons being disposed on said first plate underneath said first ribbon, one of said strips of paper being disposed above said first ribbon, the second pivotally mounted plate being disposed over said first strip of paper the second strip of paper extending across said second plate, and the cover plate extending across the second strip of paper, the cover plate having openings therein, by means of which portions of the second strip of paper may be exposed to have matter written thereon, the first strip of paper, card and inking ribbons being so positioned relative to said second strip of paper that any matter written on said second strip of paper will be transferred simultaneously to said first strip of paper and card.

JAMES POWERS.

Witnesses:
GUSTAV DREWS,
W. D. PENNEY.